US012764591B2

(12) United States Patent
Ghavam et al.

(10) Patent No.: US 12,764,591 B2
(45) Date of Patent: Oct. 13, 2026

(54) ADJUSTING WIRELESS COMMUNICATIONS BASED ON NETWORK STRENGTH

(71) Applicant: Apple Inc., Cupertino, CA (US)

(72) Inventors: Borna Ghavam, San Francisco, CA (US); Jay Mayur Khandhar, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 312 days.

(21) Appl. No.: 18/432,718

(22) Filed: Feb. 5, 2024

(65) Prior Publication Data

US 2024/0334235 A1 Oct. 3, 2024

Related U.S. Application Data

(60) Provisional application No. 63/493,445, filed on Mar. 31, 2023.

(51) Int. Cl.

*H04W 52/18* (2009.01)
*H04W 24/02* (2009.01)
*H04W 28/02* (2009.01)

(52) U.S. Cl.

CPC ....... *H04W 28/0231* (2013.01); *H04W 24/02* (2013.01)

(58) Field of Classification Search

CPC . G01S 5/0252; H04B 17/373; H04B 17/3912; H04L 1/0002; H04W 24/02;

(Continued)

(56) References Cited

U.S. PATENT DOCUMENTS 7,783,316 B1 8/2010 Mitchell
7,840,220 B1 11/2010 Mitchell (Continued)

FOREIGN PATENT DOCUMENTS

JP 2016025434 A 2/2016
JP 2016140078 A 8/2016

(Continued)

OTHER PUBLICATIONS

Chris Davies, "Sony HMZ-T3W wireless head-mounted display hands-on", Sep. 5, 2013, pp. 1-3, SlashGear.

*Primary Examiner* — Frank Duong

(74) *Attorney, Agent, or Firm* — Treyz Law Group, P.C.; Joseph F. Guihan; Jinie M. Guihan

(57) ABSTRACT

A head-mounted device may exchange wireless communications with external electronic equipment. Weak network strength for the wireless communications may cause latency that results in a suboptimal user experience. To improve operations of the head-mounted device, the head-mounted device may predict a change in network strength associated with the wireless communications. The head-mounted device may predict changes in network strength based on historical network strength data and/or scene understanding data for a physical environment. In response to predicting the change in the network strength, the head-mounted device may change a characteristic of the wireless communications. The head-mounted device may change a forward error correction applied to the wireless communications, change a bit rate of the wireless communications, and/or change a number of retries during the wireless communications.

20 Claims, 5 Drawing Sheets

(58) Field of Classification Search
CPC ............. H04W 24/04; H04W 28/0231; H04W 28/0942; H04W 28/20; H04W 28/22; H04W 52/18; H04W 52/20; H04W 52/22; H04W 52/221; H04W 52/223; H04W 52/245; H04W 52/26; H04W 52/265; H04W 52/267
See application file for complete search history.

(56) References Cited

U.S. PATENT DOCUMENTS

| | | | |
|---|---|---|---|
| 10,146,302 | B2 | 12/2018 | Tokubo |
| 10,555,192 | B2 | 2/2020 | Yang et al. |
| 11,120,266 | B2 * | 9/2021 | Rabinovich ............. G06F 3/011 |
| 11,423,507 | B2 | 8/2022 | Appu et al. |
| 11,439,917 | B2 | 9/2022 | Benedetto et al. |
| 2014/0007175 | A1 | 1/2014 | Cho et al. |
| 2020/0112625 | A1 | 4/2020 | Hancock et al. |
| 2021/0199960 | A1 | 7/2021 | Singh et al. |
| 2023/0308950 | A1 * | 9/2023 | Gaspar .................. H04W 28/22 |
| 2024/0267153 | A1 * | 8/2024 | Metwaly Saad .... H04W 72/541 |

FOREIGN PATENT DOCUMENTS

| | | | |
|---|---|---|---|
| WO | 2020031954 | A1 | 2/2020 |
| WO | 2020217458 | A1 | 10/2020 |
| WO | 2021220629 | A1 | 11/2021 |
| WO | 2023183075 | A1 | 9/2023 |

* cited by examiner

ADJUSTING WIRELESS COMMUNICATIONS BASED ON NETWORK STRENGTH

This application claims the benefit of U.S. provisional patent application No. 63/493,445 filed Mar. 31, 2023, which is hereby incorporated by reference herein in its entirety.

BACKGROUND

This relates generally to electronic devices, and, more particularly, to electronic devices with displays.

Some electronic devices such as head-mounted devices include displays that are positioned close to a user's eyes during operation (sometimes referred to as near-eye displays). The displays may present three-dimensional content to the user. If care is not taken, latency may cause artifacts and/or discomfort to a user viewing images on the head-mounted device.

SUMMARY

A method of operating an electronic device may include exchanging wireless communications with an external electronic device, predicting a change in a network strength associated with the wireless communications, and in response to predicting the change in the network strength, changing a characteristic of the wireless communications.

A method of operating an electronic device that is configured to wirelessly communicate with a head-mounted device may include rendering and wirelessly transmitting display data to the head-mounted device, predicting a change in a network strength associated with a wireless connection between the electronic device and the head-mounted device, and in response to predicting the change in the network strength, changing a characteristic of the rendering and wirelessly transmitting the display data to the head-mounted device.

A method of operating an electronic device may include exchanging wireless communications with a head-mounted device in response to a prediction for a change in a network strength associated with the wireless communications, changing a characteristic of the wireless communications. Exchanging the wireless communications may include wirelessly transmitting rendered display data to the head-mounted device.

DETAILED DESCRIPTION

Figure 1:
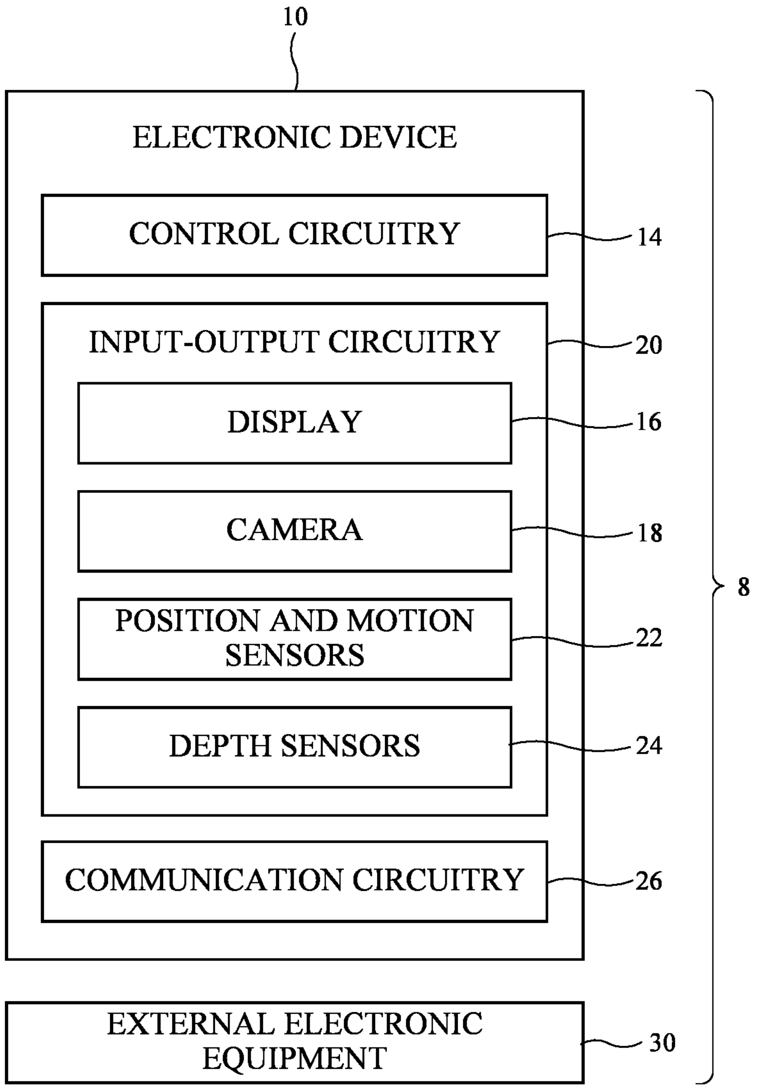
FIG. 1 is a schematic diagram of an illustrative system with an electronic device and external electronic equipment in accordance with some embodiments.

An illustrative system with an electronic device is shown in FIG. 1. System 8 includes electronic device 10 and external electronic equipment 30. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

Electronic device 10 may wirelessly communicate with external electronic equipment 30. External electronic equipment 30 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. External electronic equipment 30 may have the shape of a pair of eyeglasses (e.g., supporting frames), may form a housing having a helmet shape, or may have other configurations to help in mounting and securing the components of one or more displays on the head or near the eye of a user.

External electronic equipment 30 may include one or more server(s). The one or more servers may be implemented on one or more standalone data processing apparatus or a distributed network of computers. The one or more servers may provide information such as web page content to electronic device 10 (e.g., via a network) in response to requests from electronic device 10. The network through which electronic device 10 communicates with external electronic equipment 30 may include local area networks (LAN) and/or wide area networks (WAN) (e.g., the Internet).

As shown in FIG. 1, electronic device 10 (sometimes referred to as head-mounted device 10, system 10, head-mounted display 10, etc.) may have control circuitry 14. Control circuitry 14 may be configured to perform operations in electronic device 10 using hardware (e.g., dedicated hardware or circuitry), firmware and/or software. Software code for performing operations in electronic device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Electronic device 10 may include input-output circuitry 20. Input-output circuitry 20 may be used to allow a user to provide electronic device 10 with user input and/or to gather information on the environment in which electronic device 10 is operating. Output components in circuitry 20 may allow electronic device 10 to provide a user with output.

As shown in FIG. 1, input-output circuitry 20 may include a display such as display 16. Display 16 may be used to display images for a user of electronic device 10. Display 16 may be a sec-through (transparent) display so that a user may observe physical objects through the display while computer-generated content is overlaid on top of the physical objects by presenting computer-generated images on the display. A transparent display may be formed from a transparent pixel array (e.g., a transparent organic light-emitting diode display panel) or may be formed by a display device that provides images to a user through a beam splitter, holographic coupler, or other optical coupler (e.g., a display device such as a liquid crystal on silicon display). Alternatively, display 16 may be an opaque display that blocks light from physical objects when a user operates electronic device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 16 is opaque, the display may also optionally display entirely computer-generated content (e.g., without displaying images of the physical environment).

Display 16 may include one or more optical systems (e.g., lenses) (sometimes referred to as optical assemblies) that allow a viewer to view images on display(s) 16. A single display 16 may produce images for both eyes or a pair of displays 16 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules (sometimes referred to as display assemblies) that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Input-output circuitry 20 may include various other input-output devices. For example, input-output circuitry 20 may include one or more cameras 18. Cameras 18 may include one or more outward-facing cameras (that face the physical environment around the user when the electronic device is mounted on the user's head, as one example). Cameras 18 may capture visible light images, infrared images, or images of any other desired type. The cameras may be stereo cameras if desired. Outward-facing cameras may capture pass-through video for device 10. Cameras 18 ma include one or more inward-facing cameras (e.g., that obtain gaze detection information).

As shown in FIG. 1, input-output circuitry 20 may include position and motion sensors 22 (e.g., compasses, gyroscopes, accelerometers, and/or other devices for monitoring the location, orientation, and movement of electronic device 10, satellite navigation system circuitry such as Global Positioning System circuitry for monitoring user location, etc.). Using sensors 22, for example, control circuitry 14 can monitor the current direction in which a user's head is oriented relative to the surrounding environment (e.g., a user's head pose). Cameras 18 may also be considered part of position and motion sensors 22. The cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output circuitry 20 may include one or more depth sensors 24. Each depth sensor may be a pixelated depth sensor (e.g., that is configured to measure multiple depths across the physical environment) or a point sensor (that is configured to measure a single depth in the physical environment). Each depth sensor (whether a pixelated depth sensor or a point sensor) may use phase detection (e.g., phase detection autofocus pixel(s)) or light detection and ranging (LIDAR) to measure depth. Any combination of depth sensors may be used to determine the depth of physical objects in the physical environment.

Input-output circuitry 20 may also include other sensors and input-output components if desired (e.g., gaze tracking sensors, ambient light sensors, force sensors, temperature sensors, touch sensors, image sensors for detecting hand gestures or body poses, buttons, capacitive proximity sensors, light-based proximity sensors, other proximity sensors, strain gauges, gas sensors, pressure sensors, moisture sensors, magnetic sensors, microphones, speakers, audio components, haptic output devices such as actuators, light-emitting diodes, other light sources, etc.).

Head-mounted device 10 may also include communication circuitry 26 to allow the head-mounted device to communicate with external equipment such as electronic device 30 (e.g., a tethered computer, a portable device such as a handheld device, watch, or laptop computer, or other electrical equipment). Communication circuitry 26 may be used for both wired and wireless communication with external equipment.

Communication circuitry 26 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

The radio-frequency transceiver circuitry in wireless communications circuitry 26 may handle wireless local area network (WLAN) communications bands such as the 2.4 GHZ and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz), or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHZ and/or a second UWB communications band at 8.0 GHZ), and/or any other desired communications bands.

The radio-frequency transceiver circuitry may include millimeter/centimeter wave transceiver circuitry that supports communications at frequencies between about 10 GHz and 300 GHz. For example, the millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, the millimeter/centimeter wave transceiver circuitry may support communications in an IEEE K communications band between about 18 GHz and 27 GHz, a $K_a$ communications band between about 26.5 GHZ and 40 GHz, a Ku communications band between about 12 GHZ and 18 GHz, a V communications band between about 40 GHz and 75 GHz, a W communications band between about 75 GHz and 110 GHz, or any other desired frequency band between approximately 10 GHz and 300 GHz. If desired, the millimeter/centimeter wave transceiver circuitry may support IEEE 802.11ad communications at 60 GHz (e.g., WiGig or 60 GHz Wi-Fi bands around 57-61 GHz), and/or $5^{th}$ generation mobile networks or $5^{th}$ generation wireless systems (5G) New Radio (NR) Frequency Range 2 (FR2) communications bands between about 24 GHz and 90 GHz.

Antennas in wireless communications circuitry 26 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link and another type of antenna may be used in forming a remote wireless link antenna.

One use case that will be described herein is an example where electronic device 10 is a head-mounted device and external electronic equipment 30 is a paired, non-head-mounted device (e.g., a cellular telephone, a laptop computer, a tablet, a watch, etc.). External electronic equipment 30 may sometimes be referred to as electronic device 30 or paired electronic device 30.

Electronic device 10 may be paired with electronic device 30. In other words, a wireless link may be established between electronic devices 10 and 30 to allow fast and efficient communication between devices 10 and 30. Electronic devices 10 and 30 may be associated with the same user (e.g., signed into a cloud service using the same user ID), may exchange wireless communications, etc. Each one of electronic devices 10 and 30 may include a battery. Head-mounted device 10 may have a battery with a lower total capacity than electronic device 30 in one embodiment.

If desired, content for display 16 on head-mounted device 10 may be rendered by electronic device 30 and wirelessly transmitted from electronic device 30 to head-mounted device 10 to subsequently displayed. Rendering display content for a first electronic device using a second electronic device may sometimes be referred to herein as remote rendering. Remote rendering may be useful in mitigating the power consumption on one electronic device. For example, it may be desirable to mitigate the power consumption of head-mounted device 10. Remote rendering shifts some of the processing burden (and therefore power consumption) for operating display 16 on electronic device 10 to electronic device 30.

In some cases, a graphics processing unit (GPU) in electronic device 30 may be capable of more complex rendering operations than a graphics processing unit in electronic device 10 (e.g., in control circuitry 14). In this case, remote rendering may allow for more complex display data to be rendered than if head-mounted device 10 only used its local GPU.

Figure 2:
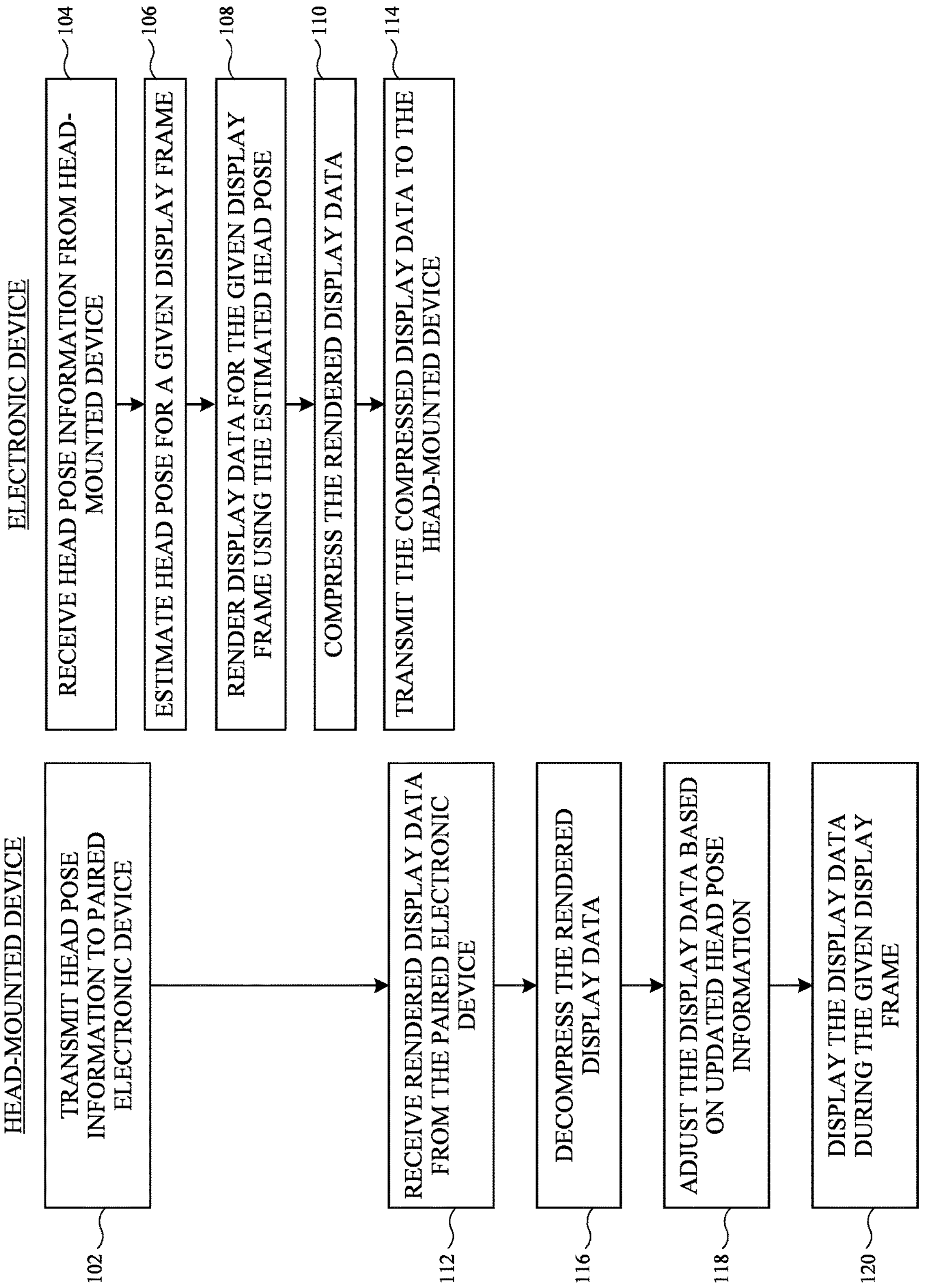
FIG. 2 is a flowchart showing illustrative method steps performed by a head-mounted device and a paired electronic device in a remote rendering arrangement in accordance with some embodiments.

FIG. 2 is a flowchart of illustrative method steps performed by a head-mounted device and a paired electronic device in a remote rendering arrangement. As shown, the steps on the left (e.g., steps 102, 112, 116, 118, and 120) are performed by a first electronic device such as head-mounted device 10 in FIG. 1. The steps on the right (e.g., steps 104, 106, 108, 110, and 114) are performed by a second electronic device such as electronic device 30 in FIG. 1. The two devices in FIG. 2 may be paired and may exchange wireless communications.

At step 102, head-mounted device 10 may transmit head pose information to the paired electronic device 30. The head-mounted device 10 may obtain the head pose information using position and motion sensors 22, as one example. The head-mounted device 10 may wirelessly transmit the head pose information (e.g., using Bluetooth communications). The head-mounted device 10 may transmit a single head pose for a single point in time, or multiple head poses associated with different points in time. In other words, the head-mounted device 10 may transmit one or more head poses, with each head pose having a corresponding time stamp. In general, the transmitted head pose information may include any desired additional sensor information, contextual information, historical data, etc.

At step 104, electronic device 30 may receive the head pose information from the paired head-mounted device 10. Electronic device 30 subsequently uses the received head pose information to estimate the head pose for a given display frame at step 106. Electronic device 30 may estimate the head pose for a given display frame using historical head pose information for head-mounted device 10 that is stored at electronic device 30. For example, the head pose information from head-mounted device 10 may identify a first head pose at a first time (t1), a second head pose at a second time (t2), and a third head pose at a third time (t3). The estimated time for the display of the given display frame is t4. The electronic device uses the head poses over time at t1, t2, and t3 to predict the head pose at t4. Electronic device 30 may use any desired number of head poses (e.g., one or more) to predict the head pose at t4.

At step 108, the electronic device 30 may render display data for the given display frame using the estimated head pose from step 106. The electronic device 30 may render the display data using a graphics processing unit or any other desired computing resources. The rendered display data may subsequently be compressed at step 110. The compressed display data is then wirelessly transmitted to the paired head-mounted device at step 114.

At step 112, head-mounted device 10 may receive the rendered display data from the paired electronic device. The received rendered display data may have an associated target head pose (e.g., the fourth head pose for time ta using the example above). At step 116, head-mounted device 10 may decompress the rendered display data. In general, any desired encoding/decoding scheme may be used for the compression and decompression of the display data.

At step 118, the head-mounted device may adjust the display data based on updated head pose information. As previously mentioned, the rendered display data may be rendered for a predicted head pose by electronic device 30. Head-mounted device 10 may revise the head pose estimation for the given display frame based on head pose data that has been obtained between step 102 (when the head pose information is transmitted to device 30) and step 118.

In the previous example, electronic device 30 renders display data for an estimated fourth head pose at the target time $t_4$ for the given display frame. At step 118, head-mounted device 10 may estimate a fifth head pose at the target time $t_4$ using updated head pose information gathered using position and motion sensors 22. At step 118, head-mounted device 10 therefore adjusts the display data to compensate for a difference between the originally predicted head pose (e.g., the fourth head pose) and the newly predicted head pose (e.g., the fifth head pose). Adjusting the display data to compensate for the difference between the originally predicted head pose and the newly predicted head pose may include reprojecting the display data to the newly predicted head pose.

Finally, at step 120, head-mounted device 10 may display the display data for the given frame using display 16. If desired, steps 118 and 120 (e.g., adjusting the display data based on head pose information and displaying the data) may be performed at a higher frequency than step 108 (e.g., rendering the display data). For example, steps 118 and 120 may be performed with a frequency twice as high as the frequency of step 108. Steps 118 and 120 may be performed at a frequency of 120 Hz whereas step 108 may be performed at a frequency of 60 Hz, as one example.

Using the remote rendering operations of FIG. 2, head-mounted device 10 conserves power relative to an arrangement where all the display data is locally rendered. However, the remote rendering operations rely on wireless communications between head-mounted device 10 and electronic device 30. Unreliable network strength between head-mounted device 10 and electronic device 30 may therefore cause undesired latency in the content displayed to the user of head-mounted device.

In the example of FIG. 2, head-mounted device 10 relies upon wireless communications for a remote rendering arrangement with an external electronic device 30. However, this example is merely illustrative. In general, head-mounted device 10 may use wireless communications in numerous applications (e.g., video conferencing, online gaming, entertainment streaming, etc.). For all of these wireless communications, weak network strength for the wireless communications may cause latency that results in a suboptimal user experience.

To improve operations of head-mounted device 10, the head-mounted device may predict a change in network strength associated with wireless communications. In response to predicting the change in the network strength, the head-mounted device may change a characteristic of the wireless communications. For example, consider a scenario in which a user is engaged in a video conference call. If the head-mounted device predicts a weakening in the network strength for the wireless communications used for the video conference call, the head-mounted device may take preemptive mitigative action such as changing a forward error correction applied to the wireless communications, changing a bit rate of the wireless communications, changing a number of retries during the wireless communications, etc.

The head-mounted device 10 may predict changes in network strength based on historical network strength data and/or scene understanding data for a physical environment.

Figure 3:
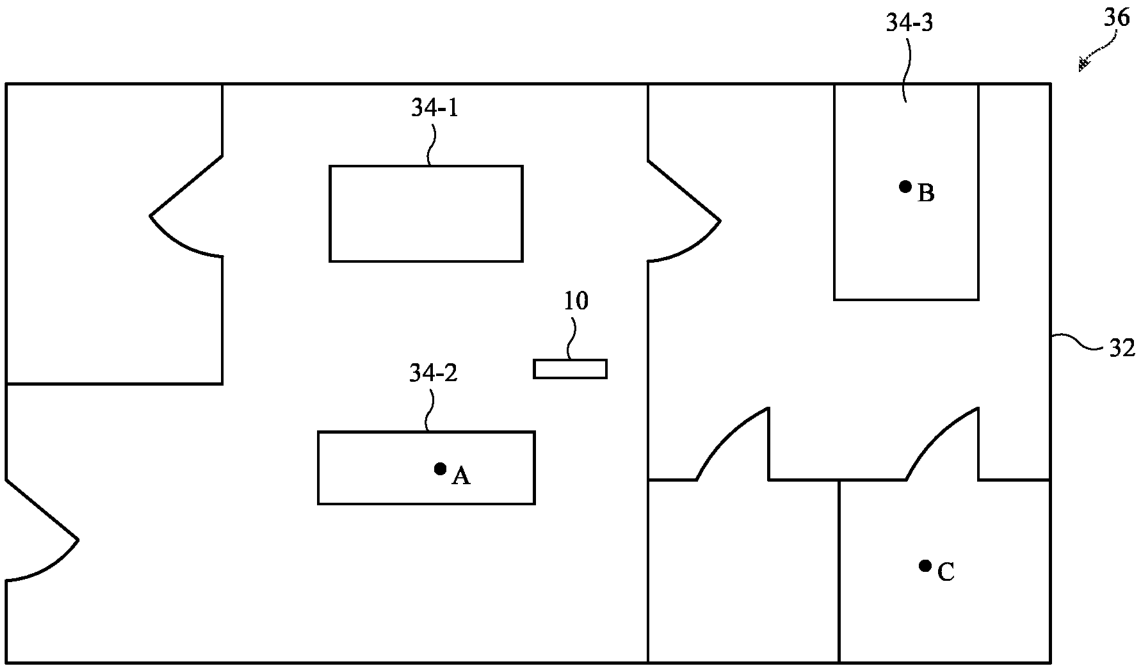
FIG. 3 is a top view of an illustrative extended reality environment including physical objects and a head-mounted device in accordance with some embodiments.

FIG. 3 is a top view of an illustrative three-dimensional environment that includes electronic device 10. In FIG. 3, three-dimensional environment 36 is an extended reality (XR) environment that includes the physical environment around electronic device 10 (with various physical objects). The three-dimensional environment 36 may optionally include one or more virtual objects. XR environment 36 may include a plurality of physical walls 32 that define several rooms (e.g., rooms in a house or apartment). There are five rooms in the example XR environment of FIG. 3. The physical environment around electronic device 10 may include physical objects such as physical object 34-1, 34-2, and 34-3. The physical objects depicted in FIG. 3 may be any desired type of physical objects (e.g., a table, a bed, a sofa, a chair, a refrigerator, etc.).

During the operation of electronic device 10, electronic device 10 may move throughout three-dimensional environment 36. In other words, a user of electronic device 10 may repeatedly carry electronic device 10 between different rooms in three-dimensional environment 36. While operating in three-dimensional environment 36, the electronic device 10 may use one or more sensors (e.g., cameras 18, position and motion sensors 22, depth sensors 24, etc.) to gather sensor data regarding the three-dimensional environment 36. The electronic device 10 may build a scene understanding data set for the three-dimensional environment.

To build the scene understanding data set, the electronic device may use inputs from sensors such as cameras 18, position and motion sensors 22, and depth sensors 24. As one example, data from the depth sensors 24 and/or position and motion sensors 22 may be used to construct a spatial mesh that represents the physical environment. The spatial mesh may include a polygonal model of the physical environment and/or a series of vertices that represent the physical environment. The spatial mesh (sometimes referred to as spatial data, etc.) may define the sizes, locations, and orientations of planes within the physical environment. The spatial mesh represents the physical environment around the electronic device.

Other data such as data from cameras 18 may be used to build the scene understanding data set. For example, camera 18 may capture images of the physical environment. The electronic device may analyze the images to identify a property of a plane in spatial mesh (e.g., the color of a plane or the material that forms the plane). The property may be included in the scene understanding data set.

The scene understanding data set may include identities for various physical objects in the extended reality environment. For example, electronic device 10 may analyze images from camera 18 and/or depth sensors 24 to identify physical objects. The electronic device 10 may identify physical objects such as a bed, a couch, a chair, a table, a refrigerator, etc. This information identifying physical objects may be included in the scene understanding data set.

The scene understanding data set may also include information regarding various virtual objects in the extended reality environment. Electronic device 10 may be used to display the virtual objects and therefore knows the identities, sizes, shapes, colors, etc. for virtual objects in the extended reality environment. This information regarding virtual objects may be included in the scene understanding data set.

The scene understanding data set may be built on electronic device 10 over time as the electronic device moves throughout the extended reality environment. For example, consider an example where electronic device 10 starts in the room in FIG. 3 that includes physical objects 34-1 and 34-2. The electronic device may use depth sensors to obtain depth information (and develop the spatial mesh) for the currently occupied room (with objects 34-1/34-2). The electronic device may develop the scene understanding data set (including the spatial mesh, physical object information, virtual object information, etc.) for the currently occupied room. At this point, the electronic device has no information for the unoccupied rooms.

Next, the electronic device 10 may be transported into the room with physical object 34-3. While in this new room, the electronic device may use depth sensors to obtain depth information (and develop the spatial mesh) for the currently occupied room (with object 34-3). The electronic device may develop the scene understanding data set (including the spatial mesh, physical object information, virtual object information, etc.) for the currently occupied room. The electronic device now has a scene understanding data set including data on both the currently occupied room (with object 34-3) and the previously occupied room (with objects 34-1 and 34-2). In other words, data may be added to the scene understanding data set when the electronic device enters new portions of the three-dimensional environment. Therefore, over time (as the electronic device is transported to every room in the three-dimensional environment), the scene understanding data set includes data on the entire three-dimensional environment 36.

Electronic device 10 may maintain a scene understanding data set that includes all scene understanding data associated with extend reality environment 36 (e.g., including both a currently occupied room and currently unoccupied rooms).

To summarize, head-mounted device 10 may maintain a scene understanding data set that includes a spatial mesh that represents the physical environment, properties of planes in the spatial mesh, identities for various physical objects in the extended reality environment, and/or information regarding various virtual objects in the extended reality environment. In addition to the scene understanding data set, head-mounted device may maintain historical network strength information. The historical network strength information may be considered part of the scene understanding data set or may be considered separate from the scene understanding data set.

The historical network strength information may be accumulated over time during operation of the head-mounted device. Network strength may be characterized in any desired manner. For example, the head-mounted device may characterize a network strength associated with wireless communications using a measured bit rate of outgoing transmissions, a measured bit rate of incoming transmissions, and/or an expected bit rate associated with the type of wireless communications being used. As additional examples, the network strength may be measured by head-mounted device 10 using milliwatts (mW), decibels per milliwatt (dBm), or received signal strength indicator (RSSI). Any subset of the aforementioned factors may be used to characterize network strength.

FIG. 3 identifies three different locations in the three-dimensional environment: location A, location B, and location C. As head-mounted device 10 spends time at each one of these locations, the network strength associated with the locations may be stored on head-mounted device 10. In addition to being associated with location, the stored network strength information may have associated time stamps (to identify trends in network strength as a function of time of day), network types (e.g., Wi-Fi versus cellular), etc.

In one example, the historical network strength information stored on electronic device 10 may all be obtained using head-mounted device 10. In another possible example, at least some of the historical network strength information may be obtained by one or more external electronic devices. Multiple devices may contribute to a communal network strength database that is then accessible by head-mounted device 10. This may enable head-mounted device 10 to use network strength information for locations that it has not yet travelled.

Consider a scenario in which the historical network strength information indicates a first network strength at location A, a second network strength at location B, and a third network strength at location C. The second network strength may be weaker than the first network strength. The third network strength may be weaker than the second network strength. The head-mounted device may detect that the user is travelling from location A towards location B. In this scenario, the head-mounted device may predict that the network strength will drop (e.g., once the user reaches location B with the weaker network strength than location A). In alternate scenario, the head-mounted device may detect that the user is travelling from location C towards location B. In this scenario, the head-mounted device may predict that the network strength will increase (e.g., once the user reaches location B with the stronger network strength than location C).

In the example where the historical network strength information stored on electronic device 10 is all obtained using head-mounted device 10, head-mounted device 10 needs to travel to each one of locations A, B, and C to obtain network strength information before network strength predictions associated with those locations can be made. In the example where at least some of the historical network strength information may be obtained by one or more external electronic devices, head-mounted device 10 may make network strength predictions associated with locations A, B, and C without having travelled to locations A, B, and C using the network strength information obtained using one or more external electronic devices.

In response to the predicted change in network strength for wireless communications, the head-mounted device may make various adjustments to the wireless communications. The adjustments may include changing a forward error correction applied to the wireless communications, changing a bit rate of the wireless communications, changing a number of retries during the wireless communications, or other desired adjustments.

An example has been described herein where the head-mounted device 10 predicts network strength using historical network strength information (that is associated with location, time of day, etc.). This example is merely illustrative. Instead or in addition, network strength predictions may be made using the scene understanding data set obtained by head-mounted device 10.

The scene understanding data set may include a spatial mesh for the room currently occupied by the head-mounted device. The spatial mesh may be used to determine the dimensions of the room including the head-mounted device. The dimensions of the room may be used to make predictions regarding network strength.

As another example, the scene understanding data set may include information regarding a material in the physical environment. For example, the scene understanding data set may identify a material (e.g., metal or concrete) that is associated with poor network strength. The head-mounted device may therefore predict a change in network strength using materials identified in the scene understanding data.

As another example, the scene understanding data set may include information regarding a physical object in the physical environment. For example, the scene understanding data set may identify a physical object that is associated with poor network strength. The head-mounted device may therefore predict a change in network strength using physical objects identified in the scene understanding data.

Consider an example where a user wearing head-mounted device 10 enters a parking garage. The scene understanding data obtained by the head-mounted device 10 may identify concrete walls around the head-mounted device. The presence of concrete walls may be associated with poor network strength. The head-mounted device 10 may therefore predict a drop in network strength when the user enters the parking garage.

As another example, the scene understanding data obtained by the head-mounted device 10 may identify that the user is in a parking garage. Being located in a parking garage may be associated with poor network strength. The head-mounted device 10 may therefore predict a drop in network strength in response to detecting the user is in the parking garage.

Figure 4:
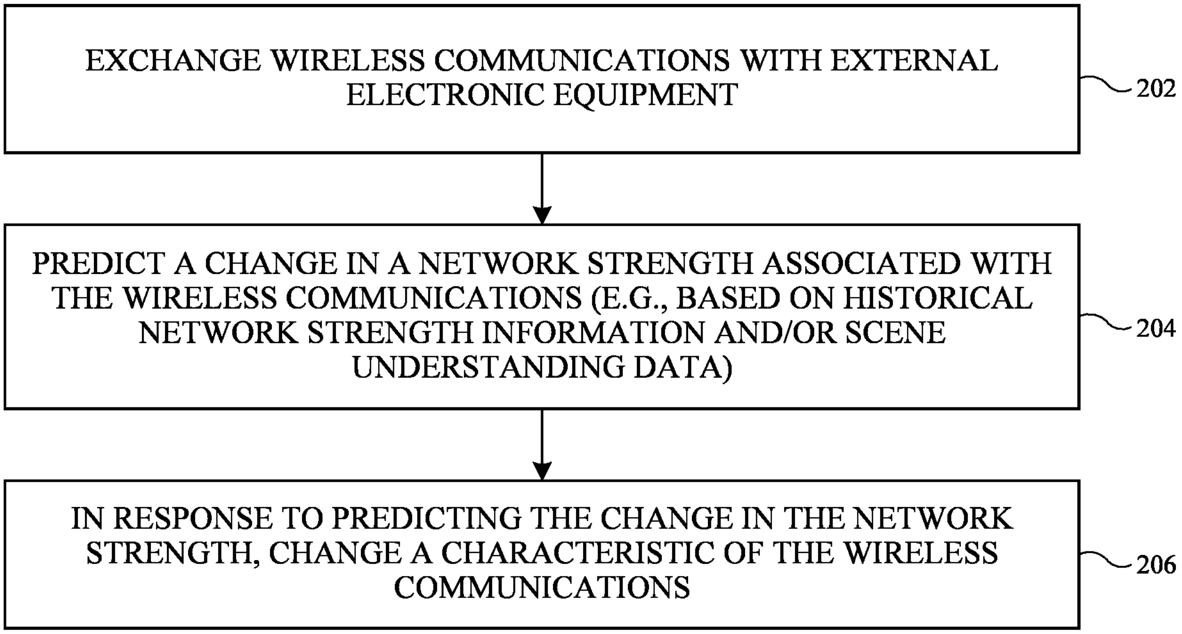
FIG. 4 is a flowchart of an illustrative method performed by a head-mounted device that changes a characteristic of wireless communications in response to predicting a change in network strength in accordance with some embodiments.

FIG. 4 is a flowchart of illustrative method steps for operating a head-mounted device. As shown, at step 202 the head-mounted device 10 may exchange wireless communications with external electronic equipment 30. The external electronic equipment may be a paired electronic device (e.g., a cellular telephone, laptop computer, tablet, watch, etc.), an external server, or other external electronic equipment. The wireless communications may include cellular communications, Bluetooth communications, Wi-Fi communications, or any other desired type of communications.

At step 204, head-mounted device 10 may predict a change in network strength associated with the wireless communications. Head-mounted device 10 may predict the change in network strength using location data (e.g., from position and motion sensors 22), historical network strength data (obtained using head-mounted device 10 and/or one or more external electronic devices), and/or scene understanding data.

For example, the head-mounted device 10 may predict a change in location and, based on historical network strength data for the current location and the predicted new location, predict a change in network strength. The head-mounted device 10 may also predict a change in network strength based on historical network strength data at a current location of the head-mounted device.

In some cases, interpolation may be used to determine a predicted network strength using the historical network strength information. For example, the historical network strength information may include a first network strength for a first location and a second network strength for a second location. When head-mounted device 10 is at (or predicted to be at) a third location that is between the first and second locations, interpolation between the first and second network strengths may be used to estimate a third network strength for the third location.

The head-mounted device may determine a depth map of a physical environment using at least depth sensors 24. The head-mounted device may predict a change in network strength using the depth map. For example, the head-mounted device may predict a change in network strength using a room layout determined using the depth map. The depth map may be considered part of a scene understanding data set maintained by the head-mounted device.

The head-mounted device may obtain a scene understanding data using camera 18, position and motion sensors 22, and/or depth sensors 24. The head-mounted device may predict a change in network strength using the scene understanding data. For example, the head-mounted device may predict a change in network strength using the identity of a physical object included in the scene understanding data. As another example, the head-mounted device may predict a change in network strength using a material (e.g., metal, concrete, drywall, or another desired material) included in the scene understanding data.

Next, at step 206, head-mounted device 10 may change a characteristic of the wireless communications in respond to predicting the change in the network strength. Examples of adjustments to the wireless communications include changing a forward error correction applied to the wireless communications, changing a bit rate of the wireless communications, changing a number of retries during the wireless communications, etc.

Consider an example where wireless communications are exchanged at step 202 without forward error correction. Then, a network strength associated with the wireless communications is predicted to drop at step 204. In this case, forward error correction may be applied to the wireless communications at step 206.

Consider another example where wireless communications are transmitted at step 202 using a first bit rate. Then, a network strength associated with the wireless communications is predicted to drop at step 204. In this case, the bit rate of the transmissions may be reduced at step 206.

As described in connection with FIG. 2, one type of wireless communication performed by head-mounted device 10 is in a remote rendering arrangement with a paired electronic device. In the remote rendering arrangement, the head-mounted device 10 receives rendered display data from the paired electronic device and displays the rendered display data on display 16. The paired electronic device may optionally render display data for multiple points of view (e.g., a first frame of image data for a primary, expected point of view and one or more auxiliary frames of image data for auxiliary points of view that are different from the primary point of view). The remote rendering communications may be adjusted at step 206 in response to a predicted change in network strength for the wireless connection between head-mounted device 10 and the paired electronic device. For example, the head-mounted device 10 may send prediction information and/or instructions regarding the predicted change in network strength to the paired electronic device. In response, the paired electronic device may render display data for a different number of points of view, with a different complexity (e.g., with a different number of polygons, three-dimensional voxel resolution, number of objects in the content, etc.), at a different resolution, and/or with a different field-of-view. The paired electronic device may render display data for a higher number of points of view (e.g., three discrete frames of image data for three respective points of view) in response to a predicted increase in network strength or with a lower number of points of view (e.g., one frame of image data for one respective point of view) in response to a predicted decrease in network strength. The paired electronic device may render display data with a higher complexity in response to a predicted increase in network strength or with a lower complexity in response to a predicted decrease in network strength. The paired electronic device may render display data with a higher resolution in response to a predicted increase in network strength or with a lower resolution in response to a predicted decrease in network strength. The paired electronic device may render display data with a larger field-of-view in response to a predicted increase in network strength or with a smaller field-of-view in response to a predicted decrease in network strength. As yet another example, at step 206 the head-mounted device 10 may (in response to a predicted weakening of network strength) cease the remote rendering arrangement and instead render display data locally using a local graphics processing unit (GPU) (e.g., a GPU in control circuitry 14).

Figure 5:
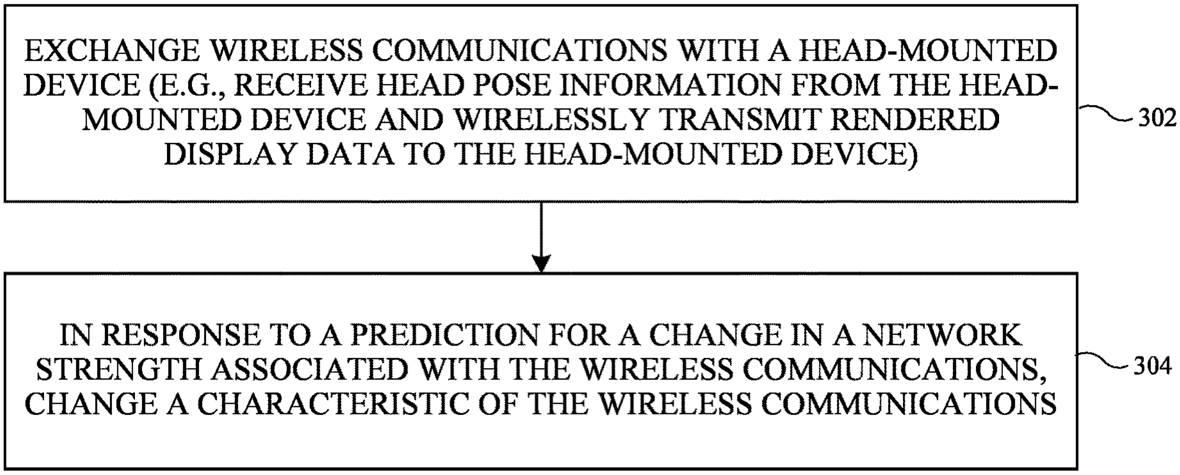
FIG. 5 is a flowchart of an illustrative method performed by an electronic device that is paired with a head-mounted device in accordance with some embodiments.

FIG. 5 is a flowchart of illustrative method steps performed by an electronic device that remotely renders display data for a paired head-mounted device. At step 302, the electronic device exchanges communications with the head-mounted device. The communications may include receiving head pose information from the head-mounted device and transmitting rendered display data to the head-mounted device.

At step 304, in response to a prediction for a change in a network strength associated with the wireless communications, the electronic device may change a characteristic of the wireless communications. The electronic device 30 may make the prediction for the change in network strength locally using location information and/or historical network strength information. Alternatively, the electronic device 30 may receive prediction information from head-mounted device 10. As yet another alternative, the electronic device 30 may receive instructions from head-mounted device 10 for an adjustment to be made to the wireless communications with head-mounted device 10 (without an explicit prediction included in the instructions).

At step 304, the electronic device may render display data for head-mounted device 10 at a different resolution and/or with a different field-of-view. For example, the electronic device 30 may render display data with a higher resolution in response to a predicted increase in network strength or with a lower resolution in response to a predicted decrease in network strength. The electronic device 30 may render display data with a larger field-of-view in response to a predicted increase in network strength or with a smaller field-of-view in response to a predicted decrease in network strength.

Instead or in addition, at step 304 electronic device 30 may change a forward error correction applied to the wireless communications, change a bit rate of the wireless communications, change a number of retries during the wireless communications, etc.

Examples are described herein regarding head pose prediction and rendering display data based on head pose prediction. It is noted that the head pose prediction may depend on a variety of factors. These include the nature of the content being rendered, the position of the user relative to their environment, the current motion of the user (e.g. walking versus standing or sitting), whether the user is in the vicinity of other users or engaged with other users, as well as historical data that has been amassed about both that specific user as well as user habits over a wider population. In terms of the nature of the content, properties like the complexity of the content, whether the content is head-locked, body-locked, or world-locked, and the placement of the content relative to both the physical and virtual environment may also play a role in determining how additional views are rendered or how content being sent over the link is adjusted.

To that end, the head pose information transmitted from head-mounted device 10 to electronic device 30 (e.g., at step 102 in FIG. 2) may include, in addition to accelerometer data from position and motion sensors 22, additional information that may impact the head pose prediction. The additional information may include information regarding the position of the user relative to their environment, the current motion of the user (e.g. walking versus standing or sitting), whether the user is in the vicinity of other users or engaged with other users, etc.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A method of operating an electronic device comprising one or more sensors, the method comprising:

exchanging wireless communications with external electronic equipment;

using the one or more sensors to obtain a scene understanding data set, wherein the scene understanding data set comprises a location of a material in a physical environment and a composition of the material in the physical environment;

predicting a change in a network strength associated with the wireless communications based at least partly on the scene understanding data set; and in response to predicting the change in the network strength, changing a characteristic of the wireless communications.

2. The method defined in claim 1, wherein changing the characteristic of the wireless communications comprises changing a forward error correction applied to the wireless communications.

3. The method defined in claim 1, wherein changing the characteristic of the wireless communications comprises changing a bit rate of the wireless communications.

4. The method defined in claim 1, wherein changing the characteristic of the wireless communications comprises changing a number of retries during the wireless communications.

5. The method defined in claim 1, wherein predicting the change in the network strength further comprises predicting the change in the network strength based on historical network strength information.

6. The method defined in claim 5, wherein the historical network strength information comprises historical network strength information at different locations and wherein predicting the change in the network strength comprises predicting a change in location from a first location with a first historical network strength to a second location with a second historical network strength that is different than the first historical network strength.

7. The method defined in claim 5, wherein predicting the change in the network strength based on the historical network strength information comprises interpolating between a first historical network strength at a first location and a second historical network strength at a second location based on a third location associated with the electronic device.

8. The method defined in claim 5, wherein the historical network strength information comprises network strength information obtained by one or more additional electronic devices.

9. The method defined in claim 1, wherein the one or more sensors comprises one or more depth sensors and wherein the method further comprises:

using the one or more depth sensors to obtain a depth map of the physical environment, wherein predicting the change in the network strength further comprises predicting the change in the network strength based on a room layout determined using the depth map.

10. The method defined in claim 1, wherein the scene understanding data set includes data on currently occupied and previously occupied rooms 9.

11. The method defined in claim 1, wherein the scene understanding data set further comprises information on a virtual object in an extended reality environment.

12. The method defined in claim 1, wherein predicting the change in the network strength based at least partly on the scene understanding data set comprises predicting the change in the network strength based on an identity of the physical object in the physical environment.

13. The method defined in claim 1, wherein the composition of the material in the physical environment comprises metal or concrete.

14. The method defined in claim 1, wherein the electronic device is a head-mounted device and wherein the external electronic equipment is a cellular telephone.

15. The method defined in claim 14, wherein exchanging the wireless communications with the external electronic equipment comprises wirelessly transmitting head pose information to the cellular telephone and wirelessly receiving display data from the cellular telephone.

16. A method of operating an electronic device that is configured to wirelessly communicate with a head-mounted device, the method comprising:

with control circuitry, rendering first display content with a first voxel resolution;

with communication circuitry, wirelessly transmitting the first display content to the head-mounted device;

predicting a change in a network strength associated with a wireless connection between the electronic device and the head-mounted device; and in response to predicting the change in the network strength:

with the control circuitry, rendering second display content with a second voxel resolution different than the first voxel resolution, and with the communication circuitry, wirelessly transmitting the second display content to the head-mounted device.

17. The method defined in claim 16, wherein rendering the first display content comprises rendering the first display content with a first number of points of view and wherein rendering the second display content comprises rendering the second display content with a second number of points of view different than the first number of points of view.

18. The method defined in claim 16, wherein rendering the first display content comprises rendering the first display content with a first field of view and wherein rendering the second display content comprises rendering the second display content with a second field of view different than the first field of view.

19. The method defined in claim 16, wherein rendering the first display content comprises rendering the first display content with a first number of polygons and wherein rendering the second display content comprises rendering the second display content with a second number of polygons different than the first number of polygons.

20. A method of operating an electronic device, the method comprising:

exchanging wireless communications with a head-mounted device, wherein exchanging the wireless communications comprises wirelessly receiving first head pose information from the head-mounted device;

estimating second head pose information based on the first head pose information;

rendering display data based on the second head pose information, wherein exchanging the wireless communications further comprises wirelessly transmitting the rendered display data to the head-mounted device; and in response to a prediction for a change in a network strength associated with the wireless communications, changing a characteristic of the wireless communications.

* * * * *